United States Patent [19]

Ritzenthaler et al.

[11] Patent Number: 4,939,934
[45] Date of Patent: Jul. 10, 1990

[54] COMBINATION INSTRUMENT

[75] Inventors: Hugo A. Ritzenthaler, Rochester Hills, Mich.; Martin Haub, Winchester, Va.

[73] Assignee: VDO Adolf Schindling AG, Frankfurt am Main, Fed. Rep. of Germany

[21] Appl. No.: 300,099

[22] Filed: Jan. 18, 1989

[51] Int. Cl.$^5$ ............................................. G01D 11/24
[52] U.S. Cl. ................................... 73/431; 116/62.4; 340/461
[58] Field of Search ............... 73/431, 866.3; 340/461; 116/305, 62.4

[56] References Cited

U.S. PATENT DOCUMENTS

| 3,161,062 | 12/1964 | Huston | 73/431 |
| 3,570,108 | 3/1971 | Sarra | 73/431 X |
| 4,207,768 | 6/1980 | Henss | 73/431 |

FOREIGN PATENT DOCUMENTS

| 247120 | 4/1926 | Italy | 116/62.4 |
| 1527 | 1/1980 | Japan | 73/431 |

Primary Examiner—Hezron E. Williams
Assistant Examiner—Joseph W. Roskos
Attorney, Agent, or Firm—Martin A. Farber

[57] ABSTRACT

A combination instrument, particularly for motor vehicles, which has an instrument holder (10) on which a plurality of display units can be mounted. The combination instrument also has a cover glass (5) which is arranged in front of the instrument holder (10) on the observer side and covers jointly all the display units. The display units can be mounted on the instrument holder (10) from the side facing away from the observer.

17 Claims, 3 Drawing Sheets

COMBINATION INSTRUMENT

FIELD AND BACKGROUND OF THE INVENTION

The present invention relates to a combination instrument, particularly for motor vehicles, having an instrument holder on which several display units can be mounted and a cover glass which covers all of the display units or gauges jointly and is arranged in front of the instrument holder on the side towards the observer.

In the case of such cluster arrangement of gauges in an instrument panel, it has been the practice to provide each gauge with its own lens, bezel, seal and lighting system, in the case that the gauge has to be lit during night time operation. When an instrument panel assembly contains a number of gauges; lens, bezel, seal and lighting as part of each individual gauge is being duplicated throughout the instrument panel assembly.

In the case of such combination instruments it is known to insert and fasten the display units into the mounting openings of the instrument holder from the side facing an observer. For this it is necessary to remove the cover g glass during the mounting of the display units. This is a disadvantage, particularly upon the replacement of a defective display unit, since, on the one hand, the expenditure of labor is great and, on the other hand, there is the danger that, as a result of insufficient care upon the reinstallation of the cover glass, it will no longer properly protect the space between the cover glass and the instrument holder from the penetration of dust and moisture.

SUMMARY OF THE INVENTION

It is an object of the invention therefore to provide a combination instrument of this type which is protected in large measure against the penetration of environmental dirt into the space formed between the cover glass and the instrument holder.

An instrument panel assembly for motor vehicles, boats and stationary machinery is described in which means are provided to mount the individual gauges from the back and protect these open gauges from the environments and handling at the front side of the panel utilizing one common lens. Night time lighting of the gauge panel assembly is achieved by means of reflected back lighting.

It is the objective of the invention to provide an improved instrument panel where individual gauges can easily be installed and exchanged from the back.

It is another object of the invention to provide an uniform and single source lighting for all gauges contained in the instrument panel.

In order to simplify and economize the instrument panel assembly and at the same time to give the instrument panel assembly more of an instrument cluster look, the principle of mounting individual gauges to the panel has been reversed from the front to the back.

According to the invention, the display units can be mounted on the instrument holder (e.g. 10) from the side facing away from the observer. In this way, penetration of moisture and dirt into the space between cover glass and instrument holder as well as into the housing of the display units is reliably prevented, particularly in the case of combination instruments installed in boats or agricultural vehicles. Such penetration of moisture and dirt would result in the coating and dirtying of the inner side of the cover glass so that proper reading of the displays would no longer be possible. Furthermore, the dirt and moisture can result in defects in the display device. In the case of the combination instrument of the invention, the cover glass is installed only upon the manufacture of the combination instrument and can, in this case, be effected with the necessary care. A subsequent replacement of display units can be effected from the side of the combination instrument that faces away from the observer. It is preferable that the display units be capable of being inserted into mounting openings (e.g. 20) in the instrument holder (10) and that the display units have, on the observer side, a display surface which corresponds to the cross secton of the mounting opening associated with them.

If the display unit is a pointer instrument (22) and the display surface a dial (7), then the position of the pointer on the scale of the dial can be adjusted before installation of the display instrument. Difficult adjustment of the position of the pointer with reference to a scale on the instrument holder is thus not necessary after the insertion of the pointer instrument.

A main display plate (4) can be arranged on the observer side of the instrument holder (10), it having viewing openings (6) which leave the display surfaces of the display units free.

For a simple determination of the axial installation position, the display units can be introduces into the mounting openings (20) of the instrument holder (10) until they come against stops (21) arranged on the instrument holder (10).

For the simple fastening of a display unit in a mounting opening, the display unit can be provided, on the circumferential surface thereof which is introduced into the mounting opening (20), with rubber-elastic ribs (24) which protrude radially in such a manner that the radial size of the display unit is slightly greater than the radial size of the mounting opening (20). The display unit need in this case merely be pushed into the mounting opening up to its installed position.

The ribs (24) are preferably radially circumferential ribs having a sawtooth-like cross section, which are directed in barb-like manner towards the side facing away from the observer. This development permits easy insertion of the display unit into the mounting opening and holds the display unit, with a certain initial force, resisting against the stop. At the same time, the ribs form a seal of the space between the cover glass and the instrument holder from the region behind the combination instrument.

A further possibility for the simple fastening of a display unit in a mounting opening resides therein that radially protruding projections (26) or screw wedges (27) which form a bayonet attachment are developed on the circumferential surface of the display unit which is to be inserted in the mounting opening (20) and on the inner wall of the mounting opening (20). By a screwlike turning in and out of the display unit in the mounting opening, insertion or removal of the display unit is easily and rapidly effected.

If an elastic ring (29) which circumferentially surrounds the display unit can be applied with initial force in this connection against the inner wall of the mounting opening (20), then, at the same time, the space between the cover glass and the instrument holder is sealed off on the back of the combination instrument.

In a third embodiment, threaded bolts (30) which are distributed axially to the mounting opening (20) and on its periphery, and protrude on the side of the instrument holder (10) facing away from the observer, can be provided, between which there extends a clamping element which rests against a stop of the display unit and is movable by the nuts (33) screwed onto the bolts (30) with respect to the instrument holder (10), and the display unit can be clamped against the stops (21) of the instrument holder (10).

In this connection, the clamping element can be simply a flange (32) which radially surrounds the display unit and rests against a radially protruding circumferential stop flange (34) of the display unit If an elastic sealing element (35) radially surrounds the display device, the sealing element (35) resting with initial force between instrument holder (10), flange (32) and stop flange (34), then a sealing of the space between the cover glass and the instrument holder on the back of the combination instrument is produced here also.

Illumination of the side of the combination instrument facing the observer by a source of light which can easily be replaced should it become defective is obtained in the manner that on the side of the instrument holder (10) facing the observer there is arranged a source of light (16) the light from which can be conducted through a continuous opening (15) formed in the radially outer region of the instrument holder (10) to a reflector (17) which is arranged in the radially circumferential edge region of the cover glass (5) between cover glass (5) and instrument holder (10) and reflects the light to the observer side of the instrument holder (10) and to the main display plate (4). For the replacement of a defective source of light, the space between the cover glass and the instrument holder therefore need not be opened. A particularly good seal is obtained in the manner that the light can be conducted from the source of light (16) to the reflector (17) via an optical light-guide (19) which passes through the opening (15).

If the reflector (17) is a reflector plate (3) clamped between an axial stop (11) and the edge region of the coverglass (5) then, at the same time, it forms a shield for the observer so that the region in which the light is introduced into the space between cover glass and instrument holder cannot be seen.

The axial stop (11) is preferably developed in radially surrounding manner, on a housing (1) of the combination instrument.

For the sealing-off on the observer side, a radially surrounding sealing ring (13) can be arranged between the axial stop (11) and the cover glass (5) as well as the reflector plate (3).

BRIEF DESCRIPTION OF THE DRAWINGS

With the above and other objects and advantages in view, the present invention will become more clearly understood in connection with a detailed description of preferred embodiments, when considered with the accompanying drawings, of which.

DETAILED DESCRIPTION OF THE PREFERRED EMBODIMENT

Figure 1:
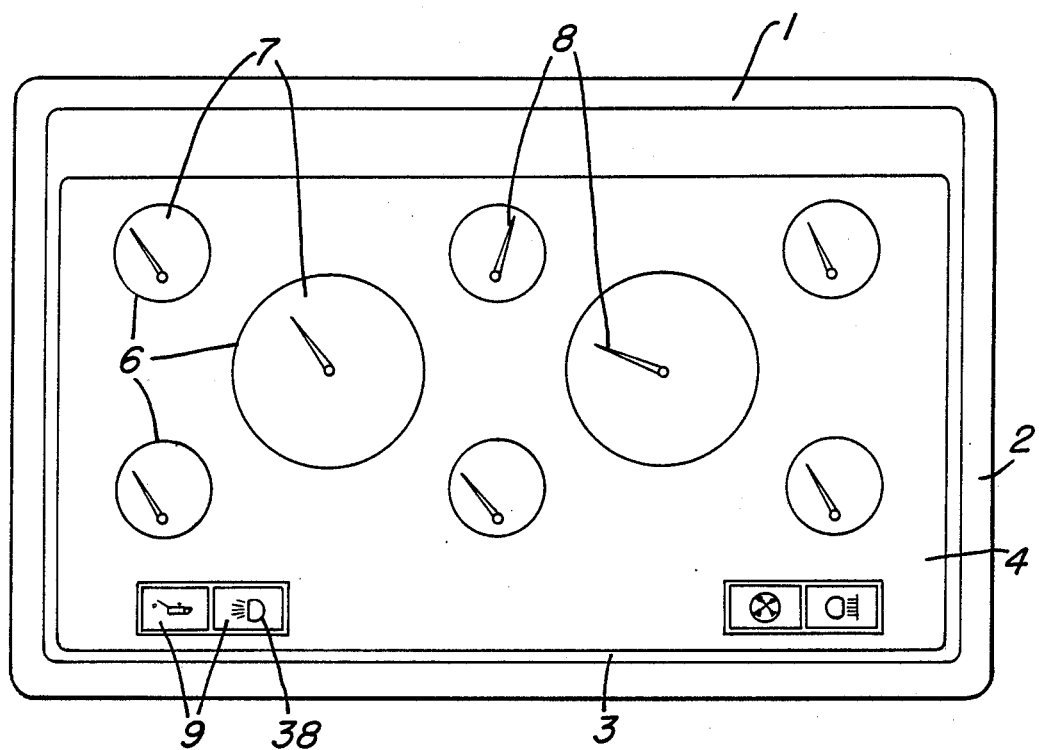
FIG. 1 is a front view of a combination instrument.

The combination instrument shown in FIG. 1 is adapted to be installed in the instrument panel of a motor vehicle and has a housing 1 with a rectangular rim 2 protruding towards an observer.

In the rim 2 there is inserted a radially surrounding reflector plate 3 in the form of a rectangular ring as well as a cover glass 5 which covers off both the reflector plate 3 and the observer side of a main display plate 4.

The dials 7 and pointers 8 of indicating instruments 22 can be seen through cover glasses 6 of the main display plate 4. The pointers 8 are of smaller radial size than the viewing openings 6, so that they can be introduced without difficulty through the viewing openings 6. Furthermore, illuminatable display fields 9 are arranged on the main display plate 4.

In FIGS. 2 to 5, the housing 1 is developed integral with instruments holders 10 which bear the main display plate 4 on the observer side. The rim 2 of the housing 1 is developed with a radially inwardly protruding circumferential stop 11 which has an annular groove 12 which is open on the observer side and into which a radially surrounding sealing ring 13 is inserted.

The reflector plate 3 and the cover glass 5 are so inserted, lying axially against the stop 11 and the sealing ring 13, into the viewing opening of the housing 1 formed by the rim 2, that the space 14 formed between cover glass 5 and instrument holder 10 is sealed off towards the observer side.

In the radially outer region of the instrument holder 10 there are developed continuous axial holes 15 through which light can be introduced into the space 14.

Figure 2:
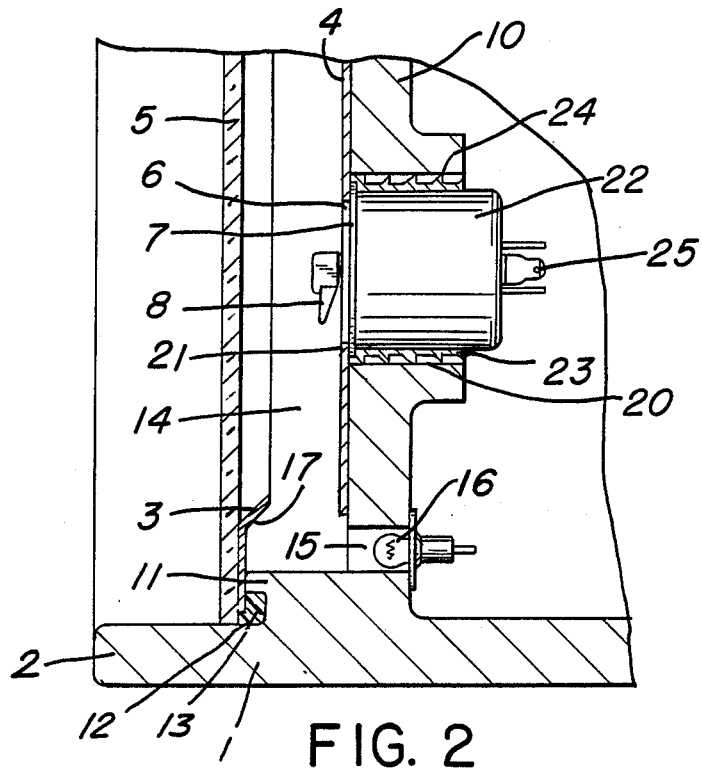
FIG. 2 shows a partial cross section through a combination instrument with a first embodiment of a fastening of a display unit.

In FIG. 2 a source of light 16 is arranged in the end of the hole 15 facing away from the observer, simultaneously closing it. Its light impinged on the reflector 17, which is developed on the side of the reflector plate 3 facing it and is reflected from there to the main display plate 4.

Figure 3:
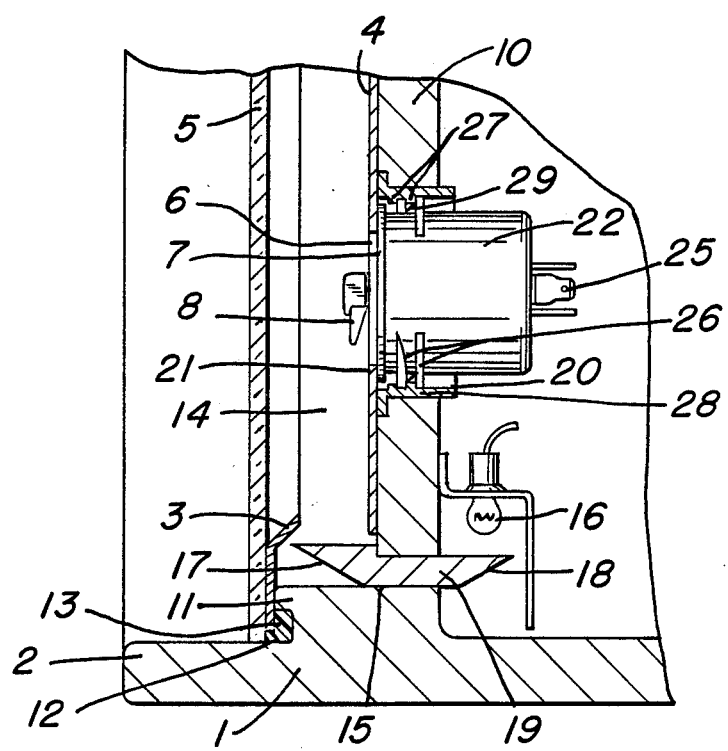
FIG. 3 is a partial cross section through a combination instrument with a second embodiment of a fastening of a display unit.

In FIG. 3 a source of light 16 is fastened behind the instrument holder 10. Its light is coupled via a coupling surface 18 into an optical waveguide 19 which extends through the opening 15 into the space 14. On the end of the optical waveguide 19 which extends into the space 14 there is a deflection surface developed as reflector 17 from which the light of the light source 16 which impinges upon it is reflected onto the main display plate 4.

Coaxial to the circular viewing openings 6 of the main display plate 5 there are developed in the instrument holder 10 contnuous circular mounting openings 20 the diameter of which is, in each case, somewhat larger than the corresponding diameter of the viewing opening 6. The annular regions of the main display plate 4 which protrude radially inward with respect to the mounting openings 20 form stops 21, up to against which the pointer instruments 22 having a cylindrical housing can be introduced into the mounting openings 20 from the side facing away from the observer. The dials 7 of the pointer instruments 22 have a somewhat wider radial size than the viewing openings 6, so that the latter are completely covered by the dials 7.

On the side facing away from the observer the pointer instruments 22 have terminal contacts 25 for connecting to a control unit, not shown.

In FIG. 2 the cylindrical outer surface of the housing of the pointer instrument 22 is firmly surrounded by a sleeve 23 of material of rubber elasticity the radially outer circumferential surface of which is provided with radially protruding, circumferential ribs 24 which have a sawtooth-shaped cross section and are directed in barb-like manner towards the side facing away from the observer. The radial size of the ribs 24 is slightly larger than the diameter of the mounting opening 20 so that they are deformed elastically upon introduction into the mounting opening 20 and, in this way, hold the pointer instrument 22 under elastic force in the mounting opening 22. The ribs 24 or teeth seal the gap between gauge and panel against dust and water penetration.

In FIG. 3, radially protruding projections 26 are arranged on the cylindrical outer surface of the housing of the pointer instrument 22, said projections 26 engaging in corresponding screw wedges 27 of a bushing 28 which forms the mounting opening 20 is firmly inserted in the instrument holder 10, forming a bayonet connection with it.

Between two projections 26 arranged axially alongdside of each other there is provided a foam gasket or elastic sealing ring 29, which tightly surrounds the housing of the pointer instrument 22 and, in the installed position shown, rests with initial force against the inner wall of the mounting opening 20. The gasket prevents dust and water from entering the instrument panel assembly from the back side.

Figure 5:
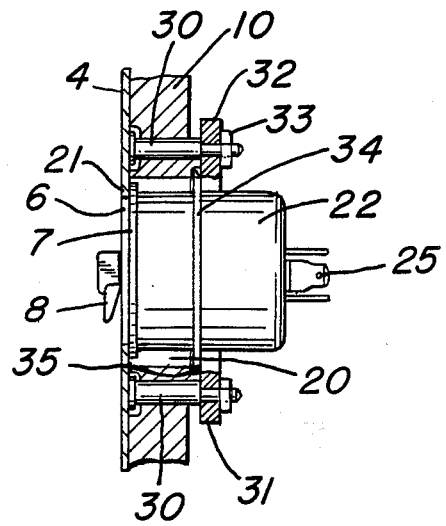
FIG. 5 shows a fourth embodiment of a fastening of a display unit, seen in cross section.

In FIG. 5, diametrically opposite each other on each side of the mounting opening 20, there are fastened to the instrument holder 10 two threaded bolts 30 which extend axially to the mounting opening 20 and protrude towards the side facing away from the observer.

The protruding bolts 30 pass through bored holes 31 in a flange 32 which radially surrounds the housing of the pointer instrument 22. By nuts 33 screwed onto the free ends of the bolts 30, the flange 32 is pulled-in to rest axially against a radially protruding circumferential stop flange 34 of the housing of the pointer instrument 22 and clamps the latter against the main display plate 4 which forms the stop 21.

An elastic sealing element 35 which radially surrounds the pointer instrument 22 in the region of the stop flange 34 is held under elastic initial force in installed position between instrument holder 10, flange 32 and stop flange 34.

Figure 4:
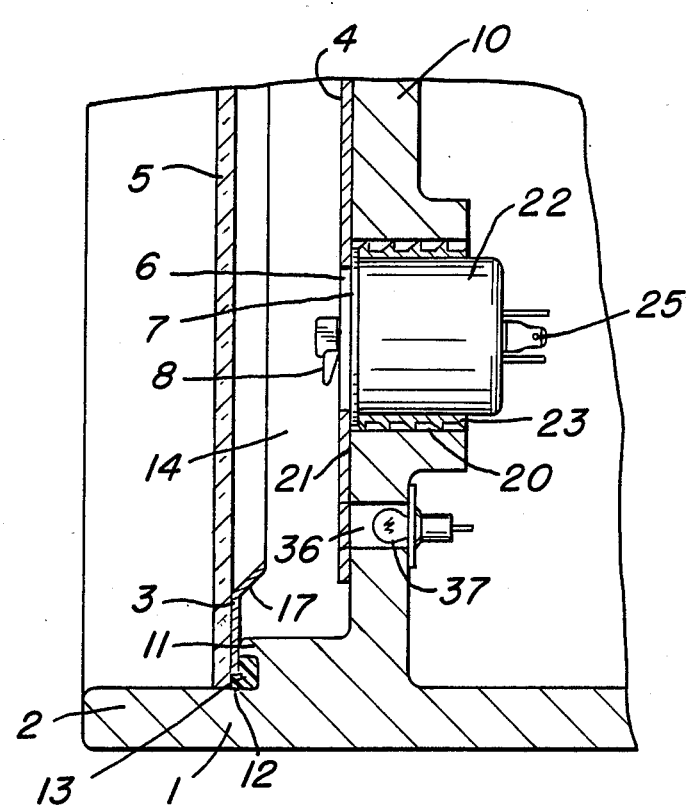
FIG. 4 is a partial cross section through a combination instrument with an illuminatable display field.

In FIG. 4, the instrument holder 10 has another continuous hole 36 into which a source of light 37 is inserted from the rear. Within the region of the hole 36, the main display plate 4 is transparent and has a symbol imprint 38, thus forming one of the display fields 9.

The fastening of the display instruments 22 in FIG. 4 corresponds to the embodiment shown in FIG. 2.

We claim:

1. A combination instrument, particularly for motor vehicles, including an instrument holder on which several display units can be mounted, and comprising further a cover glass which covers all of the display units jointly and is arranged in front of the instrument holder on the side towards the observer; and wherein
   the display units are mountable on the instrument holder from the side facing away from the observer;
   further comprising stops arranged on the instrument holder, there being mounted openings in the holder;
   wherein the display units are inserted into the mounting openings of the instrument holder until the stops;
   the display unit is provided, on a circumferential surface thereof, with elastic ribs which protrude radially more than the radial size of the mounting opening.

2. A combination instrument according to claim 1, wherein
   the instrument holder has mounting openings, and a display unit is capable of being inserted into a mounting opening in the instrument holder.

3. A combination instrument according to claim 2, wherein
   a display unit has, on the observer side, a display surface which corresponds to the cross section of the mounting opening associated with them.

4. A combination instrument according to claim 3, wherein
   the display of the display is a pointer instrument and a surface of the display is a dial 5. A combination instrument according to claim 1, wherein
   a main display plate is arranged on the observer side of the instrument holder, the holder having viewing openings which leave the display surfaces of the display units free.

6. A combination instrument according to claim 1, wherein
   the ribs extend circumferentially around a display unit and have cross sections in the form of saw teeth which are directed in a barb-like manner towards the side facing away from an observer.

7. A combination instrument according to claim 1, further comprising
   threaded bolts which are distributed axially to a mounting opening along its periphery, and protrude on a side of the instrument holder facing away from an observer;
   nuts screwed on the bolts;
   a clamping element extending between the bolts and resting against a stop of the display unit, the clamping element being movable by the nuts on the bolts with respect to the instrument holder, the clamping element comprising a display unit against the stops of the instrument holder.

8. A combination instrument according to claim 7, wherein
   the clamping element is a flange which radially surrounds the display unit, a display unit having a radially protruding circumferential stop flange, the clamping element resting against the circumferential stop flange of the display unit.

9. A combination instrument according to claim 8, further comprising
   an elastic sealing element which radially surrounds a display device, the sealing element exerting a force between instrument holder, the clamping flange, and the stop flange.

10. A combination instrument according to claim 1, further comprising
    a source of light located on a side of the instrument holder facing an observer, there being a reflector located in a radially circumferential edge region of the cover glass between the cover glass and the instrument holder, light of the source being conducted through a continuous opening formed in a radially outer region of the instrument holder to the reflector which reflects the light to the observer side of the instrument holder and to the main display plate.

11. A combination instrument according to claim 10, further comprising
   an optical light guide which passes through said continuous opening; and wherein
   the light is conducted from the source of light to the reflector via said optical light-guide through the opening.

12. A combination instrument according to claim 10, further comprising
   a housing and an axial stop developed in radially surrounding manner on the housing.

13. A combination instrument according to claim 12, wherein
   the reflector comprises a reflector plate clamped between the axial stop and an edge region of the cover glass.

14. A combination instrument according to claim 13, further comprising
   a radially surrounding sealing ring located between the axial stop and the cover glass as well as the reflector plate.

15. A combination instrument according to claim 1, wherein the elastic ribs are made of rubber.

16. a combination instrument, particularly for motor vehicles, including an instrument holder on which several display units can be mounted, and comprising further a cover glass which coverw all of the display units jointly and is arranged in front of the instrument holder on the side towards the observer; and wherein
   the display units are mountable on the instrument holder from the side facing away from the observer;
   stops arranged on the instrument holder, there being mounting openings in the holder;
   wherein the display units are inserted into the mounting openings of the instrument holder until the stops; and
   the instrument further comprises a bayonet attachment formed of radially protruding projections or screw wedges developed on a circumferential surface of a display unit which is to be inserted in a mounting opening, the bayonet attachment engaging on the inner wall of the mounting opening.

17. A combination instrument according to claim 16, further comprising an elastic ring which circumferentially surrounds a display unit and exerts a force against the inner wall of a mounting opening.

* * * * *